United States Patent

[11] 3,613,025

[72] Inventor Wesley L. Joosten, Jr.
El Paso, Tex.
[21] Appl. No. 874,279
[22] Filed Nov. 5, 1969
[45] Patented Oct. 12, 1971
[73] Assignee Globe Universal Sciences, Inc.
Midland, Tex.

[54] LOW PASS ASTABLE MULTIVIBRATOR
3 Claims, 4 Drawing Figs.

[52] U.S. Cl. .......... 331/47, 307/246, 307/247, 331/54, 331/55, 331/108 D, 331/113 R, 331/145
[51] Int. Cl. .......... H03k3/282, H03k 3/286
[50] Field of Search .......... 331/46, 54, 47, 55, 113 R, 145, 144, 108 C, 108 D, 50–53; 307/246, 247

[56] References Cited

UNITED STATES PATENTS 3,230,479 1/1966 Henrion .......... 331/54 X
3,517,339 6/1970 Hubbard et al. .......... 331/113 X

*Primary Examiner*—Roy Lake
*Assistant Examiner*—Siegfried H. Grimm
*Attorneys*—Arnold, White & Durkee, Paul Van Slyke, Tom Arnold, Frank S. Vaden, III and Robert A. White

ABSTRACT: A free-running multivibrator circuit adapted to change oscillation frequency in response to the change in capacitance of at least one of a pair of capacitors which are not necessarily electrically isolated. The circuit comprises a free-running astable multivibrator of the common type which is controlled and synchronized by a set-reset bistable multivibrator. The outputs of the astable multivibrator provide the driving waveforms for the capacitors, but the waveforms are modified by the time constant of the capacitors which in turn control the bistable multivibrator that synchronizes the astable multivibrator.

The low-pass astable multivibrator has application for measuring capacitance as in a microphone circuit having dual capacitor elements or any type of pressure sensor such as a rate-of-climb indicator for aircraft.

Wesley L. Joosten, Jr.
INVENTOR

BY Arnold, Roylance,
Kruger & Durkee
ATTORNEYS

Wesley L. Joosten, Jr.
INVENTOR

BY Arnold, Roylance, Kruger & Durkee
ATTORNEY

LOW PASS ASTABLE MULTIVIBRATOR

BACKGROUND OF THE INVENTION

This invention relates to an electronic oscillator circuit and, more specifically, to a free-running multivibrator circuit which can be controlled by the capacitance of a pair of capacitors which are not necessarily electrically isolated from each other.

The frequency of oscillation and pulse width of the output of a conventional free-running multivibrator is controlled by the time constant of the capacitive networks coupled between stages. In certain applications, it is desirable to have a free-running multivibrator-type of circuit whose operation is controlled by capacitive elements which are electrically coupled to each other. This is in contrast to the standard multivibrator circuit where the interstage capacitive coupling networks are isolated from each other by some active elements such as a transistor or a vacuum tube.

An example of the application where a multivibrator is desired to be controlled by capacitive elements which are coupled together is found in the copending application by Edwin R. Bullard, Jr. and Wesley L. Joosten, Jr. entitled "-Capacitance Variometer," Ser. No. 874,221, filed Nov. 5, 1969. In such application, there is described an electronic variometer for indicating change in elevation as in aircraft. A pressure sensor is used which includes a pair of capacitors whose capacitance is changed by the deflection of a diaphragm. Each capacitor element includes a separate stator plate and diaphragm, but the diaphragms of the two capacitor elements are placed adjacent to each other such that changes in pressure cause simultaneous deflection of both diaphragms in the same direction. The pressure sensor operates in a push-pull mode; as the capacitance of one element increases, the capacitance of the other element decreases. This dual capacitor arrangement results in linearity of output response as a function of diaphragm deflection.

In a dual-element capacitor transducer it is difficult, if not impossible, to maintain electrical isolation between the two capacitive elements. This makes the standard multivibrator circuit unusable because of the requirement for isolated capacitors for proper operation.

SUMMARY OF THE INVENTION

The present invention provides a novel square wave oscillator or multivibrator circuit whose frequency of operation can be controlled by a pair of capacitive elements which are not necessarily coupled together. The equivalent circuit for the present invention is in configuration of a low-pass filter between the interstages of active elements, and hence the present invention is termed a "low-pass astable multivibrator."

One embodiment of the invention comprises a free-running astable multivibrator of the common type which is controlled and synchronized by a set-reset bistable multivibrator. The output of the astable multivibrator provides the driving waveforms for a pair of capacitors, but the waveforms are modified by the time constant of the capacitors. The capacitors thus control the bistable multivibrator which in turn synchronizes the astable multivibrator.

The low-pass astable multivibrator has application for measuring capacitance as in a microphone circuit having dual capacitor elements or any type of pressure sensor such as a rate-of-climb indicator for aircraft. It can also be used to measure the value of an unknown capacitance where a known capacitance is substituted for one of the two capacitors in the circuit and the unknown capacitance becomes the other capacitor.

In a more specific sense, the present invention comprises an astable multivibrator circuit with first and second gate control inputs and first and second outputs. A first capacitive element is coupled between the first output of the multivibrator circuit and a point of fixed potential. A second capacitive element is coupled between the second input of the multivibrator circuit and the point of fixed potential to which the first capacitive element is connected. A first NAND gate having first and second inputs and an output has its first input coupled to the output of the multivibrators. The second input of the first NAND gate is connected to the first gate control input of the multivibrator circuit. A second NAND gate which has a first and second input and an output has its output coupled to the second input of the first NAND gate. The first output of the second NAND gate is coupled to the second gate control input of the multivibrator circuit. The second input of the second NAND gate is coupled to the second output of the multivibrator circuit.

BRIEF DESCRIPTION OF THE DRAWINGS

The invention will now be described by way of example with reference to the accompanying drawings, in which.

DETAILED DESCRIPTION OF THE DRAWINGS

Figure 1:
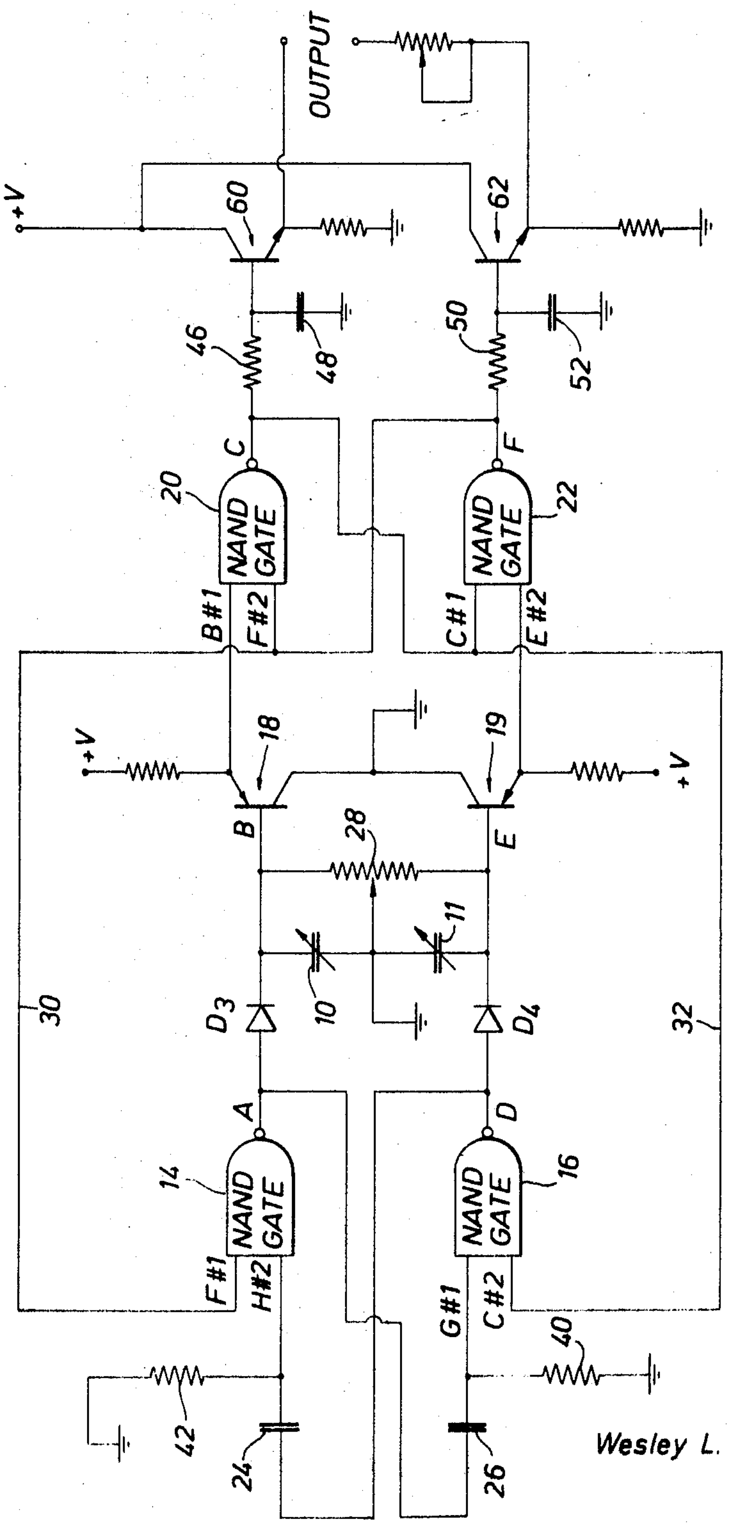
FIG. 1 is a schematic diagram of a circuit embodying the invention.

Referring to FIG. 1, the capacitors 10 and 11 represent the capacitive elements which are designed to control the time constant of the oscillator. Capacitors 10 and 11 may be, for example, the elements of a dual pressure sensor for the rate-of-climb indicator described in the pending application mentioned above. Both capacitors 10 and 11 are indicated as being variable, but it will of course be understood that in certain applications only one or neither of them will be variable.

In the circuit illustrated, there are four basic stages:

1. A free-running multivibrator stage of conventional type including NAND gates 14 and 16;
2. a pair of low-pass networks including capacitors 10 and 11;
3. a pair of emitter follower circuits comprising transistors 18 and 19; and
4. a set-reset bistable multivibrator comprising NAND gates 20 and 22.

In the following, the term NAND gate will be used in the sense of an inverting AND gate; that is, a logical device which produces a logical output "0" condition only when a pair of logical "1" conditions are coincident on the inputs.

Figure 3:
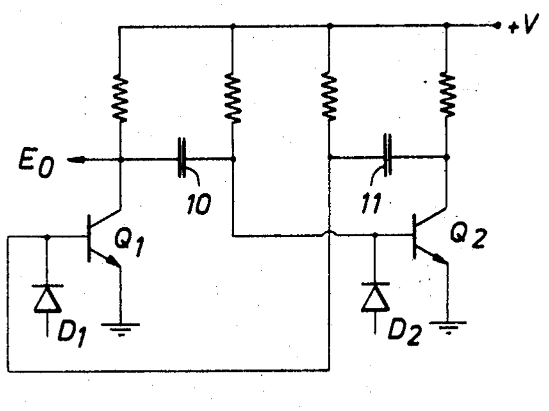
FIG. 3 is a schematic diagram of the equivalent circuit for the standard astable multivibrator appearing in FIG. 1.
Figure 4:
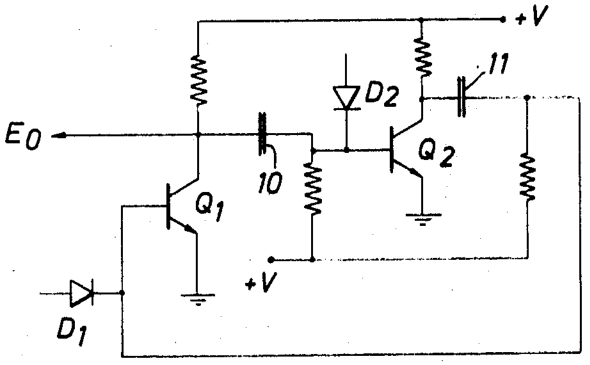
FIG. 4 is a schematic diagram of the equivalent circuit for the circuit of FIG. 3.

The free-running multivibrator stage, comprising NAND gates 14 and 16, is shown with integrated circuits as the active elements. The equivalent circuit diagram for transistor circuitry is illustrated in FIG. 3, where diodes $D_1$ and $D_2$ correspond with inputs No. 1 to gates 14 and 16 (FIG. 1). The circuit of FIG. 3 is shown in equivalent form in FIG. 4 to illustrate that capacitors 24 and 26 act as high-pass filters for the interstage coupling networks between transistors $Q_1$ and $Q_2$. Thus, the conventional astable multivibrator can be called a "-high-pass multivibrator" because of the high-pass interstage coupling network.

Referring again to FIG. 1, it can be seen that the present invention includes low-pass interstage coupling networks comprising the capacitors 10 and 11 and the resistance of the voltage divider 28. Hence, the circuit embodying the invention is termed a "Low-Pass Astable Multivibrator."

It will be observed that because there is no AC coupling between the astable multivibrator comprising NAND gates 14 and 16, and the bistable multivibrator comprising NAND gates 20 and 22, there must be some active triggering or synchronizing signals to keep the circuit oscillating. Continuous oscillation is provided by the astable multivibrator including NAND gates 14 and 16, but the circuit is controlled by the time constant associated with capacitors 10 and 11. The bistable multivibrator comprising NAND gates 20 and 22 provide gate control signals which are applied through lines 30 and 32 to NAND gates 14 and 16 respectively.

Figure 2:
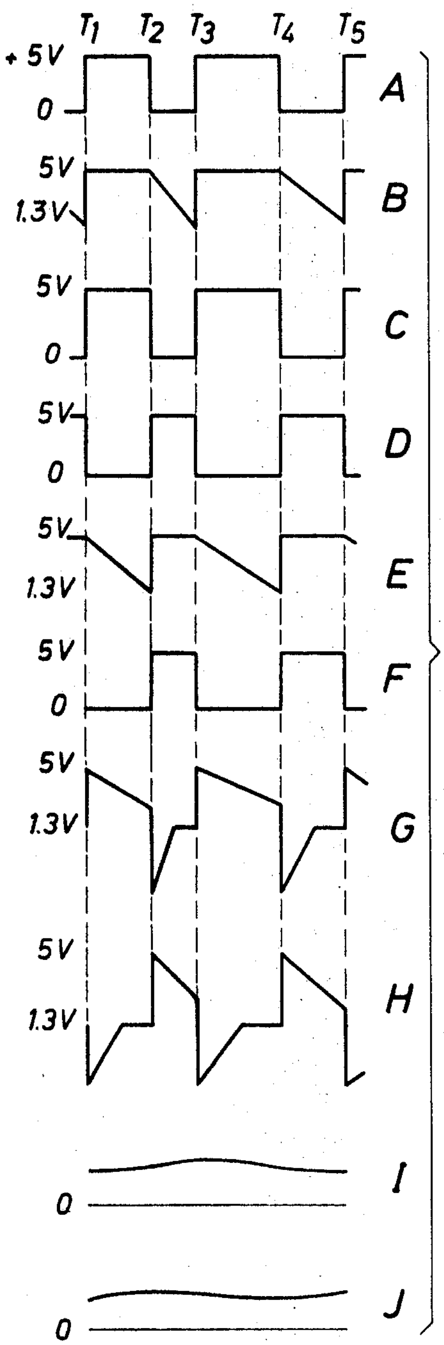
FIG. 2 illustrated waveforms appearing in the circuit of FIG. 1.

The waveforms which appear in the circuit of FIG. 1 are illustrated in FIG. 2 and are keyed by letters to the points in the circuit in FIG. 1 at which the waveforms occur.

Referring to both FIGS. 1 and 2, there will be described the operation of the astable multivibrator comprising NAND gates 14 and 16, without regard to the effect of the gating signals applied to lines 30 and 32. For the purposes of illustration, logic levels of +5.0 volts will be used to indicate a "1" condition and 1.3 volts for a logical "0" condition. Assume first that the output of NAND gate 14 is at +5.0 volts at the time $T_1$, as indicated by waveform A. Capacitor 26 charges to +5.0 volts and immediately turns on NAND gate 16. During the period from the time $T_1$–$T_2$ capacitor 26 discharges through resistor 40 until a level of 1.3 volts is reached, at which time gate 16 is turned off and the output indicated by waveform D goes to +5.0 volts. When the output of gate 16 goes to +5.0 volts at time $T_2$, capacitor 24 is charged to +5.0 volts, turning on gate 14. During the time $T_2$–$T_3$ capacitor 24 discharges through resistor 42 to 1.3 volts, at the end of which time gate 14 is turned off and the output indicated by waveform A goes to +5.0 volts.

The above description has been made for the operation of the astable multivibrator without consideration of the gating signals applied on lines 30 and 32. It will be noted that if at any time either input No. 1 to gate 14 or input No. 2 to gate 16 is held at the "1" condition, the operation of the astable multivibrator will not be affected. However, if either of these gate control inputs is changed to the "0" condition, the operation of the astable multivibrator will be affected. For example, if the input No. 2 to gate 16 is inhibited by the "0" condition (as shown by waveform C at time $T_2$) prior to the time at which input No. 1 would normally reach an "0" condition (+1.3 v. as shown by waveform G after $T_2$), the output of gate 16 will be switched to the "1" condition as shown by waveform D. Thus, by alternately placing a "0" condition on lines 30 and 32, the astable multivibrator is made to oscillate at a frequency which is higher than the free-running frequency. This free-running frequency is determined by the time constants of the frequency-determining networks capacitor 24—resistor 42 and capacitor 26—resistor 40. Although this free-running astable multivibrator can be thusly synchronized when the free-running frequency is from 0.1 to 1.3 times the synchronizing frequency, best operation is achieved when the astable multivibrator is adjusted to free run at a frequency of from 0.5 to 0.75 times the desired synchronizing frequency, where the "desired synchronizing frequency" is that as determined by the low-pass networks capacitor 10—resistor 28 and capacitor 11—resistor 28.

Now consider the operation of the remaining portion of the circuit and in particular the low-pass networks, including capacitors 10 and 11 and the bistable multivibrator including NAND gates 20 and 22.

Assume that at time $T_1$ the output of NAND gate 16 as shown by waveform D switches from the "1" to the "0" condition. This "0" condition of waveform D is applied to the gate 2 of NAND gate 14 through capacitor 24 and causes the output to go to a "1" condition as shown by waveform A, without regard for the signal at input No. 1 as shown by waveform F.

When the output of NAND gate 14 switches to "1" at $T_1$, capacitor C26 is charged to 5 v. and begins to discharge to zero as shown by waveform G. At the same time $T_1$ that the output of NAND gate 16 switched from the "1" to the "0" condition, diode D4 disconnects the low-pass circuit of capacitor 11—resistor 28 from the output of NAND gate 16, thus allowing capacitor 11 to discharge to zero through resistor 28 as shown by waveform E. Since the time constant of the low-pass network of capacitor 11—resistor 28 is smaller than the time constant for the network of capacitor 26—resistor 40, the voltage as shown by the waveform E will reach a "0" condition (+1.3 volts) at time $T_2$ before the voltage as shown by waveform G.

Thus, at time $T_2$, the input No. 2 to NAND gate 22 becomes a "0" condition as shown by waveform E; and the output of NAND gate 22 becomes a "1" as shown by waveform F, without regard for the signal at input No. 1 as shown by waveform C.

It was previously explained how the output of NAND gate 14 as shown by waveform A went to the "1" level at $T_1$. This causes the input No. 1 to NAND gate 20 to become a "1" condition at $T_1$ as shown by waveform B. At $T_2$, when the output of NAND gate 22 as shown by waveform F became a "1" condition, the two inputs to NAND gate 20, being both in the "1" condition, cause the output as shown by waveform C to become a "0" condition. The "0" condition on line 32 resets NAND gate 16 as previously explained so that its output becomes a "1" condition as shown by waveform D.

This switching of NAND gate 16 output from a "0" condition to a "1" condition at time $T_2$ causes a "1" condition to be applied to gate No. 2 input of NAND gate 14 as shown by waveform H. The input No. 1 to NAND gate 14 was already in a "1" condition as previously explained. Thus, with both inputs now "1", the output of NAND gate 14 switches to "0" condition and starts the other half cycle of operation involving the discharge of capacitor 10 through resistor 28 in the same manner as just described for capacitor 11 discharging through resistor 28.

The emitter follower circuits comprising transistors 18 and 19 provide for interstage impedance matching. Diodes $D_3$ and $D_4$ provide for isolation of gates 14 and 16 during discharge of capacitors 10 and 11.

The input No. 1 to NAND gate 20 provides what might be considered the set pulse for the bistable multivibrator, and the input No. 2 to NAND gate 22 provides the reset pulse. It will be noted that the output of the bistable multivibrator is tied by gate control lines 30 and 32 to the astable multivibrator. Hence, the astable multivibrator is slaved to the bistable multivibrator, but the astable multivibrator provides the driving waveforms for the capacitors 10 and 11. Capacitors 10 and 11 merely determine the time constant for the operation of the astable multivibrator. The bistable multivibrator provides for storage of the condition indicated by the time constant of capacitors 10 and 11 during the period when the astable multivibrator is cycling through its operation. For example, the bistable multivibrator stores the time $T_2$–$T_3$ which is required for discharge through capacitor 10 and also stores the time $T_3$ and $T_4$ which is required for discharge of capacitor 11.

The outputs from NAND gates 20 and 22 as shown by waveforms C and F are applied respectively to a pair of low-pass filter networks, one comprising resistor 46 and capacitor 48 and the other comprising resistor 50 and capacitor 52. These low-pass filter networks remove the high-frequency waveforms generated by the multivibrators and leave only the average value or DC value which is proportional to the change in capacitance of capacitors 10 and 11. These average values are shown by waveforms I and J in FIG. 2. The filtered waveforms are then applied to a differential amplifier comprising transistors 60 and 62. The difference signal from the differential amplifier is then applied to a suitable indicator such as a D'Arsonval meter.

What is claimed is:

1. An electronic oscillator circuit comprising:

an astable multivibrator circuit having a first and second gate control input and first and second outputs;

a first capacitive element coupled between said first output of said multivibrator circuit and a point of fixed potential;

a second capacitive element coupled between said second output of said multivibrator circuit and said point of fixed potential;

a first NAND gate having a first and second input and an output, said first input of said first NAND gate being DC coupled to said first output of said multivibrator circuit, said second input of said first NAND gate being connected to said first gate control input of said multivibrator circuit; and a second NAND gate having a first and second input and an output, said output of said second NAND gate being coupled to said second input of said first NAND gate, said first input of said second NAND gate being coupled to said output of said first NAND gate and also to said second gate control input of said multivibrator circuit, said second input of said second NAND gate being DC coupled to said second output of said multivibrator circuit.

2. An electronic oscillator circuit comprising the combination of:

an astable multivibrator circuit, said astable multivibrator circuit having a pair of gate control inputs;

a bistable multivibrator circuit having a set and reset input, the two outputs of said bistable multivibrator being connected respectively to said gate control inputs of said astable multivibrator;

a pair of capacitive elements coupled together at a common juncture, each of said capacitive elements being coupled respectively to an output of said astable multivibrator, the outputs of said astable multivibrator circuit being connected respectively to the set and reset inputs of said bistable multivibrator, whereby said bistable multivibrator circuit is triggered by said astable multivibrator circuit.

3. An electronic oscillator circuit comprising the combination of:

an astable multivibrator circuit having a pair of outputs and a pair of gate control inputs;

a resistive-capacitive network coupled to said pair of outputs;

means coupled to said resistive-capacitve network and said gate control inputs for triggering the oscillation of said astable multivibrator in accordance with the time constant of said resistive-capacitive network.